United States Patent
Jain

(10) Patent No.: US 11,748,441 B1
(45) Date of Patent: Sep. 5, 2023

(54) SERVING REAL-TIME BIG DATA ANALYTICS ON BROWSER USING PROBABILISTIC DATA STRUCTURES

(71) Applicant: SAP SE, Walldorf (DE)

(72) Inventor: Shashank Mohan Jain, Bangalore (IN)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 17/740,596

(22) Filed: May 10, 2022

(51) Int. Cl.
  *G06F 16/958* (2019.01)
  *G06F 16/2455* (2019.01)
  *G06F 16/22* (2019.01)

(52) U.S. Cl.
  CPC ........ *G06F 16/972* (2019.01); *G06F 16/2219* (2019.01); *G06F 16/2272* (2019.01); *G06F 16/24568* (2019.01)

(58) Field of Classification Search
  None
  See application file for complete search history.

(56) References Cited

U.S. PATENT DOCUMENTS

| | | | | |
|---|---|---|---|---|
| 10,783,082 B2 * | 9/2020 | Yao | ..................... | G06F 16/2443 |
| 10,965,780 B2 * | 3/2021 | Gorin | ................... | G06F 40/146 |
| 11,341,192 B2 * | 5/2022 | P | ........................... | G06F 21/645 |
| 11,470,142 B2 * | 10/2022 | Simons | .................... | H04L 67/01 |
| 2021/0271513 A1 * | 9/2021 | Tiwary | .................... | H04L 67/10 |
| 2021/0328974 A1 * | 10/2021 | Grooters | ............... | H04L 9/0643 |
| 2021/0392054 A1 * | 12/2021 | David | ................ | G06K 7/10297 |
| 2022/0083364 A1 * | 3/2022 | Jain | ........................ | G06F 9/5027 |
| 2022/0263917 A1 * | 8/2022 | Simons | .................... | H04L 67/01 |

* cited by examiner

*Primary Examiner* — Quang N Nguyen
(74) *Attorney, Agent, or Firm* — Buckley, Maschoff & Talwalkar LLC

(57) ABSTRACT

Some embodiments may be associated with a cloud computing environment. A computer processor of a data analysis server may receive a stream of big data associated with the cloud computing environment. The data analysis server may then create a probabilistic data structure (e.g., a sketch) representing the received stream of big data and store the created probabilistic data structure into the probabilistic data structure repository. A request for data analytics is then received from a remote client browser. Responsive to the received request, the data analysis server may retrieve the probabilistic data structure from the probabilistic data structure repository and push a WebAssembly ("Wasm") module and the retrieved probabilistic data structure to the client browser. According to some embodiments, the data analysis server may then receive new updates to the stream of big data and send delta changes to the client browser via a WebSocket protocol.

15 Claims, 11 Drawing Sheets

600

| | HYPERLOGLOG HASHED BITSTRING | | | | | | | |
|---|---|---|---|---|---|---|---|---|
| RECORD 1 | 1 | 0 | 1 | 0 | 1 | 0 | 1 | 0 |
| RECORD 2 | 0 | 1 | 1 | 0 | 0 | 1 | 1 | 0 |
| RECORD 3 | 0 | 0 | 0 | 0 | 1 | 0 | 0 | 1 |
| RECORD 4 | 1 | 0 | 1 | 1 | 0 | 0 | 1 | 0 |
| RECORD 5 | 0 | 0 | 0 | 1 | 0 | 1 | 0 | 1 |
| RECORD 6 | 1 | 1 | 0 | 0 | 0 | 0 | 0 | 0 |
| RECORD 7 | 0 | 1 | 1 | 1 | 0 | 1 | 0 | 0 |
| RECORD 8 | 0 | 1 | 1 | 0 | 0 | 1 | 1 | 1 |
| RECORD 9 | 1 | 0 | 1 | 0 | 0 | 1 | 0 | 0 |
| RECORD 10 | 1 | 0 | 0 | 1 | 1 | 0 | 1 | 0 |
| RECORD 11 | 0 | 1 | 0 | 0 | 0 | 1 | 1 | 1 |
| RECORD 12 | 1 | 1 | 1 | 1 | 1 | 0 | 0 | 0 |
| RECORD 13 | 0 | 0 | 0 | 1 | 0 | 1 | 0 | 1 |
| RECORD 14 | 0 | 1 | 0 | 0 | 0 | 0 | 1 | 0 |
| RECORD 15 | 1 | 0 | 1 | 0 | 1 | 0 | 0 | 0 |

APPROXIMATE COUNT = $2^4 = 16$

*FIG. 6*

SERVING REAL-TIME BIG DATA ANALYTICS ON BROWSER USING PROBABILISTIC DATA STRUCTURES

BACKGROUND

An enterprise may use applications to perform business functions. For example, cloud-based applications may be used to process purchase orders, handle human resources tasks, interact with customers, etc. In many domains (e.g., Application Programming Interface ("API") management, Internet of Things ("IoT"), etc.), big data analytics can help understand how the cloud computing environment is operating. For example, in API management, an operator might want to track commit counts for Github based on time, repositories, committers, etc. Typical analytics (e.g., aggregation and averaging) on big data are performed either by storing everything in a columnar storage or using a distributed framework, such as MapReduce (e.g., Hadoop and spark) to perform calculations.

In the API management domain, for example, data records may store tenant identifiers (representing a tenant), proxy names (representing the API proxy via which the client requests are forwarded), an API Uniform Resource Locator ("URL") (the target API and URL where the proxy forwards the request, and a number of hits (the count for each record). Traditionally, this information might be collected and stored for six months or a year. However, such an approach can result in substantial storage costs (e.g., 100 million records might need to be stored). Moreover, the serving of a query can take a substantial amount of time because the system needs to fire different group by queries (e.g., get the hits for a particular API and for a specific tenant for an hour). Note that this is a time-consuming process because the database engine will need to process all of the records across the complete storage.

Consider FIG. 1 which is a typical system 100 to perform big data analytics, e.g., to capture trends, patterns, and/or aggregates on big data. The system includes a APACHE SPARK™ component 110 (an open-source unified analytics engine for large-scale data processing that provides an interface for programming clusters with data parallelism and fault tolerance) that communicates with a Hadoop component 120 (an open-source software framework for storing data and running applications on clusters of hardware that provides storage for any kind of data and the ability to handle concurrent tasks or jobs) via an APACHE KAFKA® messaging bus 130 (an open-source distributed event streaming platform for data pipelines, streaming analytics, data integration, and/or mission-critical applications). This is huge infrastructure which needs to be deployed on the cloud to manage and operate the big data analytics. Such a system 100 may lead to substantial problems:

- operations of such a big data infrastructure becomes a problem from a storage and maintenance point-of-view, and
- the roundtrip time from server to client may be substantial (because many queries access the data).

This approach adds to software operations overhead, because the system and/or administrator need to care about a lot of moving parts. In most of these scenarios, however, the system is able to tolerate some level of approximation (e.g., within a controlled error rate). It would be desirable to perform big data analytics for a cloud computing environment in a secure, efficient, and approximate manner.

SUMMARY

Methods and systems may be associated with a cloud computing environment. A computer processor of a data analysis server may receive a stream of big data associated with the cloud computing environment. The data analysis server may then create a probabilistic data structure (e.g., a sketch) representing the received stream of big data and store the created probabilistic data structure into the probabilistic data structure repository. A request for data analytics is then received from a remote client browser. Responsive to the received request, the data analysis server may retrieve the probabilistic data structure from the probabilistic data structure repository and push a WebAssembly ("Wasm") module and the retrieved probabilistic data structure to the client browser. According to some embodiments, the data analysis server may then receive new updates to the stream of big data and send delta changes to the client browser via a WebSocket protocol.

Some embodiments comprise: means for receiving, by a computer processor of a data analysis server, a stream of big data associated with a cloud computing environment; means for creating a probabilistic data structure representing the received stream of big data; mean for storing the created probabilistic data structure into a probabilistic data structure repository; means for receiving, from a remote client browser, a request for data analytics; responsive to the received request, means for retrieving the probabilistic data structure from the probabilistic data structure repository; and means for pushing a Wasm module and the retrieved probabilistic data structure to the client browser.

Some technical advantages of some embodiments disclosed herein are improved systems and methods to perform big data analytics for a cloud computing environment in a secure, efficient, and approximate manner.

BRIEF DESCRIPTION OF THE DRAWINGS

FIG. 6 illustrates a HyperLogLog sketch according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 2:
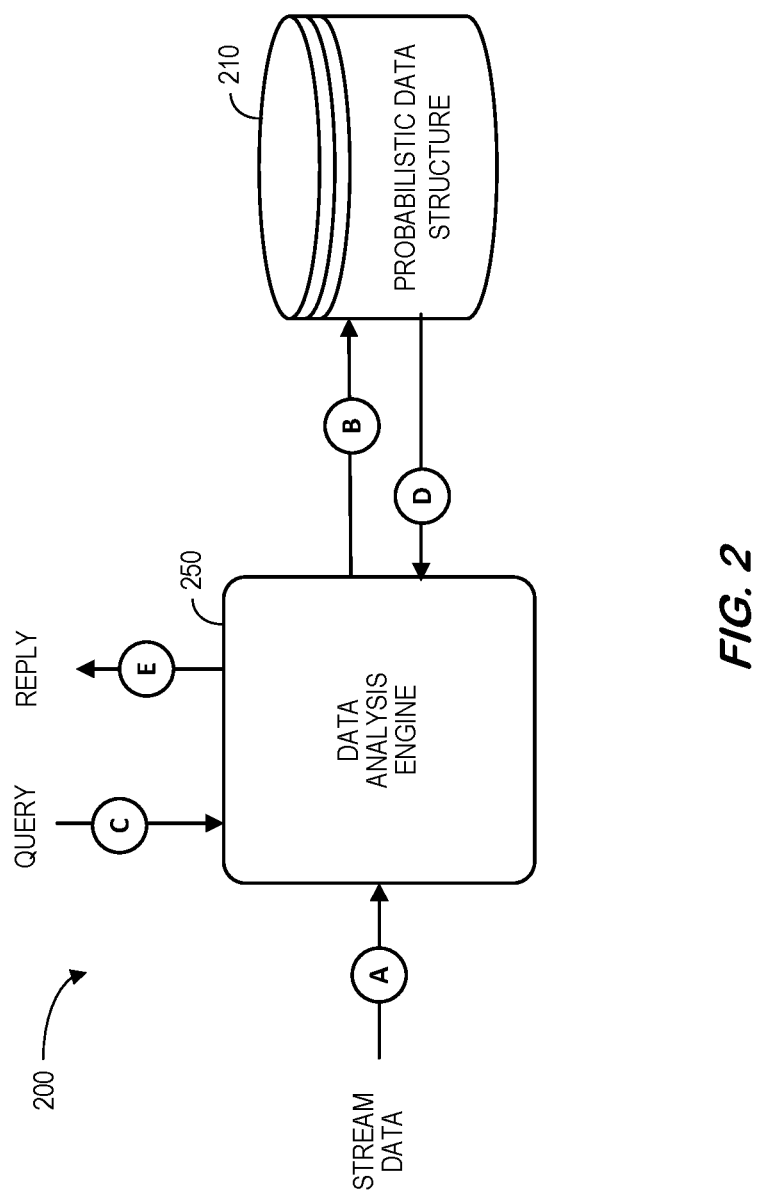
FIG. 2 is a high-level architecture for a system in accordance with some embodiments.

FIG. 2 is a high-level block diagram of a system 200 according to some embodiments. At (A), a data analysis engine 250 receives a stream of data (e.g., big data actions being monitored by the system). At (B), the data analysis engine 250 may update a probabilistic data structure 210 based on the received data stream and then continue monitoring the information (e.g., for detected actions). As used herein, the phrase "probabilistic data structure" may refer to one of a group of data structures that are useful in connection with big data and streaming applications. These data structures may use hash functions to randomize and compactly represent a set of items. Collisions may be ignored, but errors are well-controlled and under a known threshold. Compared to error-free approaches, these data structures may use substantially less memory and have a constant query time.

At (C), the data analysis engine 250 may receive a query (e.g., asking how many actions were detected in a given period of time). Based on the details of the query, the data analysis engine 250 automatically accesses information in the probabilistic data structure 210 at (D). A used herein, the term "automatically" may refer to a device or process that can operate with little or no human interaction. A reply to the query is then output by the data analysis engine 250 at (E). Note that separate elements of the system 200 might instead be used to update and retrieve information from the probabilistic data structure 210 (instead of a single data analysis engine 250).

According to some embodiments, devices, including those associated with the system 200 and any other device described herein, may exchange data via any communication network, which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 200 may store data into and/or retrieve data from various data stores (e.g., the probabilistic data structure 210), which may be locally stored or reside remote from the data analysis engine 250. Although a single data analysis engine 250 is shown in FIG. 2, any number of such devices may be included. Moreover, various devices described herein might be combined according to embodiments of the present invention. For example, in some embodiments, the data analysis engine 250 and the probabilistic data structure 210 might comprise a single apparatus. Some or all of the system 200 functions may be performed by a constellation of networked apparatuses, such as in a distributed processing or cloud-based architecture.

An operator (e.g., a database administrator) may access the system 200 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various mapping relationships) and/or provide or receive automatically generated recommendations, results, and/or alerts from the system 200.

Figure 3:
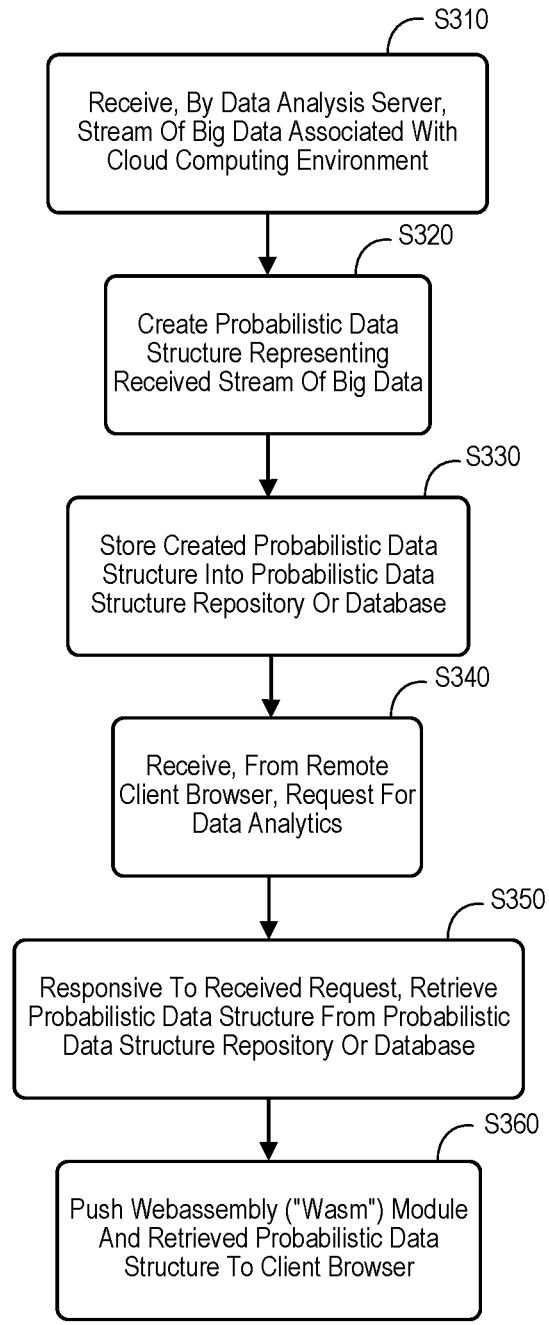
FIG. 3 illustrates a method according to some embodiments.

FIG. 3 illustrates a method to perform big data analytics for a cloud computing environment in a secure, efficient, and approximate manner according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store instructions that when executed by a machine result in performance according to any of the embodiments described herein.

At S310, a computer processor of a data analysis server may receive a stream of big data associated with a cloud computing environment. According to some embodiments, the stream of big data may include monitored or detected actions that might be associated with, for example, commit counts, commit counts based on time, commit counts based on committer, commit counts based on repository, an IoT-like domain, an API management domain, a re-usable, multi-domain service, etc. The information about a detected action performed in the cloud computing environment may include action characteristics, such as a tenant name, a proxy name, an API name, a date, a number of hits, etc. According to some embodiments, the monitored action may be subject to data analytics, such as data aggregation and/or data averaging.

At S320, a probabilistic data structure representing the received stream of big data may be created. The probabilistic data structure may comprise a hash-based sketch, and multiple sketches might be applied to the received stream of big data. Examples of sketches include a MinHash, a HyperLogLog (described in connection with FIG. 6), a BloomFilter, a Count-Min sketch, a t-Digest, etc. At S330, the system may store the created probabilistic data structure into a probabilistic data structure repository. As used herein, the phrase "data structure repository" may refer to any element with an ability to store a probabilistic data structure such as, for example, a database, filesystem, or digital library.

At S340, a request for data analytics may be received from a remote client browser. The request for data analytics might be associated with, for example, capturing trend information, detecting patterns, aggregating the stream of big data, etc. According to some embodiments, the request for data analytics may be further associated with cardinality estimation (e.g., a measure of the "number of unique elements" in a set) and/or temporal information. Responsive to the received request, at S350 the probabilistic data structure may be retrieved from the probabilistic data structure repository or database, and the system may push a Wasm module and the retrieved probabilistic data structure to the client browser at S360. According to some embodiments, a data analysis server is further to receive new updates to the stream of big data and send delta changes to the client browser via a WebSocket protocol.

In this way, embodiments may combine Wasm with sketches and use a WebSocket protocol for a substantially real-time exchange updated of information. As used herein, the phrase "substantially real time" may refer to an exchange of information that appears to a user or operator to happen "on-the-fly" as the actions occur. Some embodiments may use a Count-Min sketch for approximate counting/aggregation (and HyperLogLog for cardinality estimation) to compress the data into a sketch-based tabular representation (that is, the probabilistic data structure). Embodiments may create a Wasm module for querying the probabilistic data structure. This Wasm module may expose two functions:

readDataFromSketch, and

Update Sketch.

A WebSocket-based connection is then used to keep updating the sketches (e.g., as more data arrives at the server).

Figure 4:
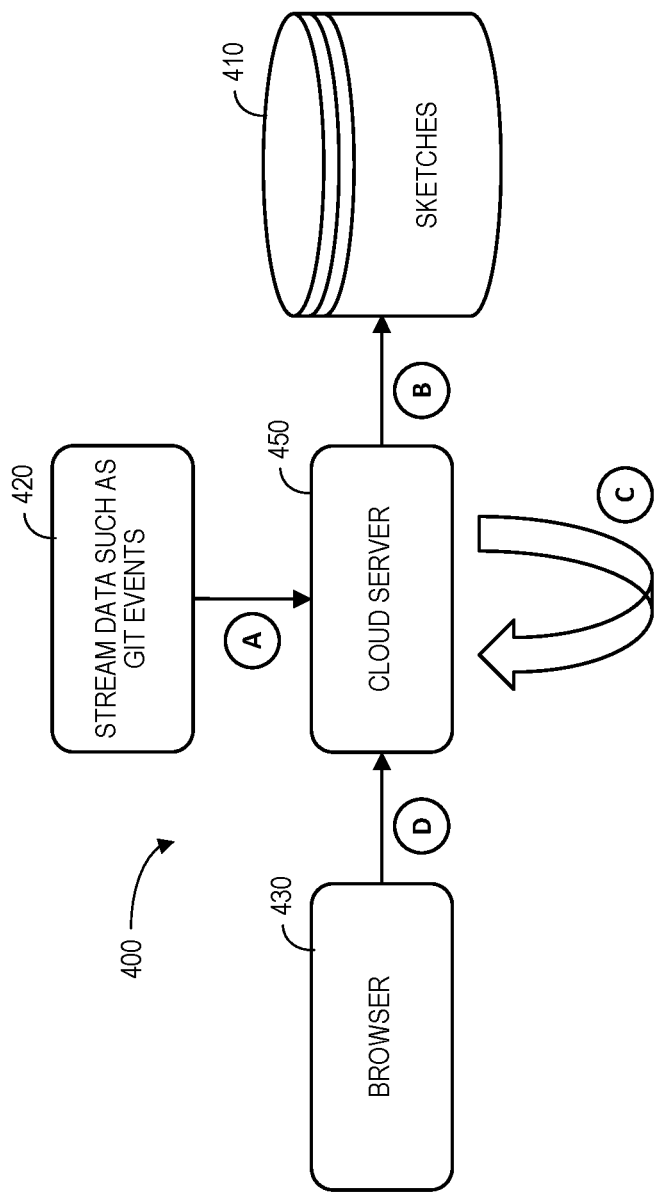
FIG. 4 is a more detailed system according to some embodiments.

FIG. 4 is a more detailed system 400 according to some embodiments. At (A), a stream of data (e.g., such as git events) 420 is pushed as events to a cloud server 450. At (B), the cloud server 420 generates and stores information about the stream of data 420 as sketches 410. At (C), the cloud server 450 creates an appropriate Wasm, which is pushed, along with the sketch 410, to a browser 430 at (D). For example, consider a system 400 to count the commits on a Git repository on an hourly/daily/weekly/monthly/yearly basis. These might also be grouped by time and/or committer name. The system 400 may also need to calculate a cardinality estimation representing how many unique commits happened for the repository.

Figure 5:
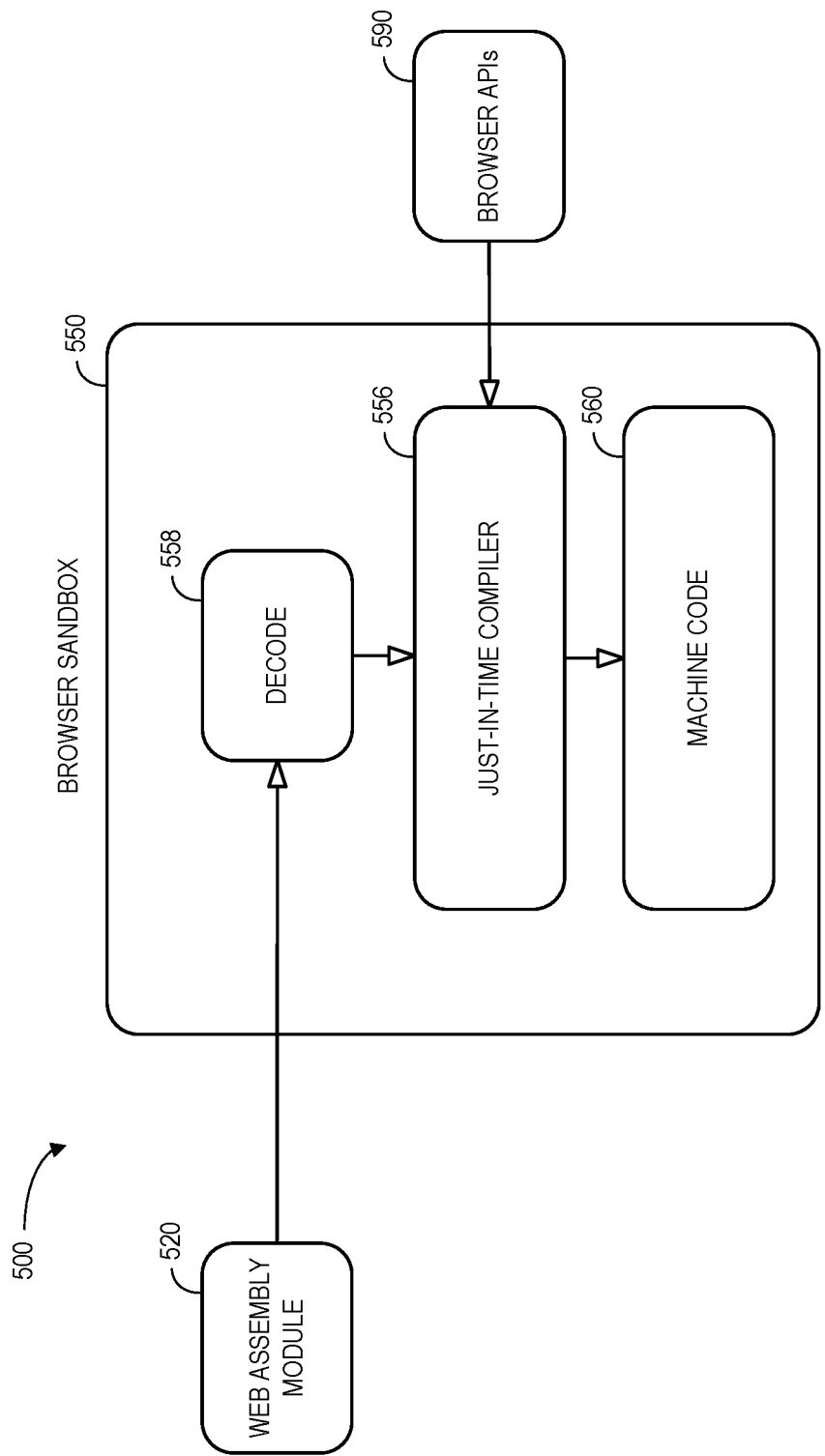
FIG. 5 is a high-level block diagram of "WebAssembly" system 400 in accordance with some embodiments.

The system 400 may use multiple sketches 410 to achieve a high degree of compression on the data making it transferrable over the Internet to the browser 430. The cloud server 450 also has a Wasm module with functions to read and write to these sketches 410. Moreover, the client browser 430 may, according to some embodiments, execute the Wasm module in a Wasm browser sandbox associated with a memory heap that is not accessible from outside the Wasm browser sandbox. For example, FIG. 5 is a high-level block diagram of "WebAssembly" system 500 in accordance with some embodiments. In particular, a browser sandbox 550 may execute a WebAssembly module 520.

For the WebAssembly module 520, the browser sandbox 550 may utilize a decode element 558 before executing a Just-In-Time ("JIT") compiler 556 that also receives browser APIs 590. The output of the JIT compiler 556 may comprise machine code 560. According to some embodiments, the WebAssembly module 520 is a portable binary format designed to be: compact and fast to parse/load so it can be efficiently transferred, loaded, and executed by the browser; compatible with existing web platforms (e.g., to allow calls to/from, access browser APIs 590, etc.); and run in a secure browser sandbox 550. Note that higher-level languages can be compiled to a WebAssembly module 520 that is then run by the browser in the same sandboxed environment. Moreover, WebAssembly modules 520 compiled from higher-level languages may have been already parsed and compiled/optimized so they can go through a fast-decoding phase (as the module is already in bytecode format close to machine code) before being injected into the JIT compiler 556. As a result, WebAssembly may represent a more efficient/faster way of running code in a browser, using any higher-level language that can target it for development, while being compatible with existing web technologies.

The sketch sent to the browser may, according to some embodiments, use a HyperLogLog sketch to generate a cardinality estimation. For example, FIG. 6 illustrates 600 a HyperLogLog sketch according to some embodiments. In particular, each of fifteen different records is associated with an 8-bit hashed bitstring. Assuming a uniform distribution, it can be concluded that approximately half of the bitstrings begin with a "0," and the other half begin with a "1." Similarly, approximately one-fourth of the bitstrings begin with "00," and approximately one-eighth begin with "000." In general, approximately 1 out of every $2^z$ of uniformly distributed bitstrings will begin with a sequence of z 0 s.

As shown in FIG. 6, the longest sequence of leading 0 s is "0000" which is associated with "Record 3." The probability of this happening on any random bitstring is $\frac{1}{16}$. Another way of saying that is, one would need 16 random bitstrings (on average) to find one that begins with "0000." As a result, the system may approximate that there are 16 records in the illustration 600. In some implementations, each bitstring is split into multiple segments, and the cardinality is computed as the harmonic mean of $2^z$ for each of those segments. Bias from hash collisions may be handled by a multiplicative constant, and linear counting may be used to give more precise counts for smaller sets. In general, HyperLogLog is a space-efficient approach to approximating the number of unique items in a set.

Figure 7:
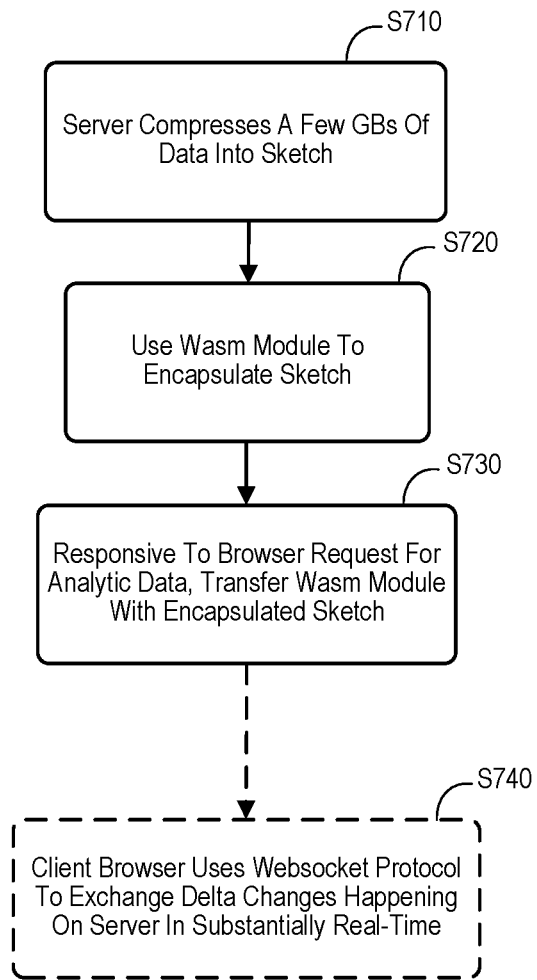
FIG. 7 is a more detailed method in accordance with some embodiments.

FIG. 7 is a more detailed method in accordance with some embodiments. At S710, a server compresses several Giga-Bytes ("GBs") of data into a sketch representation using a Count-Min sketch and HyperLogLog. Note that the sketches may vary based on different "group by" queries and data stream characteristics. At S720, the Server uses Wasm as the methodology for compute, which allows for secure execution of the module within a user browser. The Wasm module encapsulates the sketches that were created in step S710. Upon a browser request for analytic data, the Wasm module with encapsulated sketch is transferred to the browser of client at S730. Because the size of the sketch is minimal, the Wasm module and sketch can be loaded very fast. Optionally (as illustrated by dashed lines in FIG. 7), at S740 the client browser may use the WebSocket protocol to exchange delta changes that happen to the sketches at the server as more data arrives. The client-side sketches can be updated in substantially real time.

Consider as an example API Management as a domain (but embodiments are not limited to that domain), where a record includes a tenant identifier that represents the tenant, a proxy name that represents the API proxy via which the client requests are forwarded, an API name/URL may represent the target API name and URL where the proxy forwards the request, a date may indicate when the request occurred, and hits may represent the count for that record. Traditionally, this information may be monitored and stored for six months or a year, which can lead to two major issues:

substantial storage costs are involved when 100 million records are stored in the table, and serving a query can take a substantial amount of time as the system fires different group by queries (e.g., get the hits for an API and for a specific tenant for an hour), which can be a time-consuming process because the database engine must process records across the complete storage (and end up doing sequential scans for aggregations). These kind of problems can occur in various domains, such as when the system wants to count commit counts for Github based on time, repositories, committers, etc. and the IoT-like domains.

According to some embodiments, the system may compromise a relatively small amount of accuracy to achieve a high degree of compression. To do so, embodiments may use a probabilistic data structure such as a "Count-Min sketch"

to achieve highly compressed storage and to make the query lookup as O(1) for the fast retrieval of results. As used herein, the phrase "Count-Min sketch" may refer to a probabilistic data structure that serves as a frequency table (or sketch) of events in a stream of data. The sketch uses hash functions to map events to frequencies. Unlike a hash table, the count-min sketch uses sub-linear space (at the expense of overcounting some events due to collisions). A Count-Min sketch typically has a sublinear number of cells, related to the desired approximation quality of the sketch. Note that a goal of a Count-Min sketch is to consume a stream of events, one at a time, and count the frequency of the different types of events in the stream. The sketch can be queried for the frequency of a particular event type i from a universe of event types V. The sketch will then return an estimate of this frequency that is within a certain distance of the true frequency (with a certain probability).

The sketch data structure may be a two-dimensional array of w columns and d rows. The parameters w and d are fixed when the sketch is created and determine the time and space needs and the probability of error when the sketch is queried for a frequency. Associated with each of the d rows is a separate hash function (pairwise independent hash functions). The parameters w and d can be chosen by setting $w=\lceil e/\varepsilon \rceil$ and $d=\lceil \ln 1/\delta \rceil$, where the error in answering a query is within an additive factor of $\varepsilon$ with probability $1-\delta$ and e is Euler's number.

When a new event of type i arrives, the sketch is updated as follows: for each row j of the table, apply the corresponding hash function to obtain a column index $k=h_j(i)$. Then increment the value in row j, column k by one. Note that given two streams, constructing a sketch on each stream and summing the sketches yields the same result as concatenating the streams and constructing a sketch on the concatenated streams. This may make the sketch mergeable and appropriate for use in distributed settings in addition to streaming ones.

Figure 1:
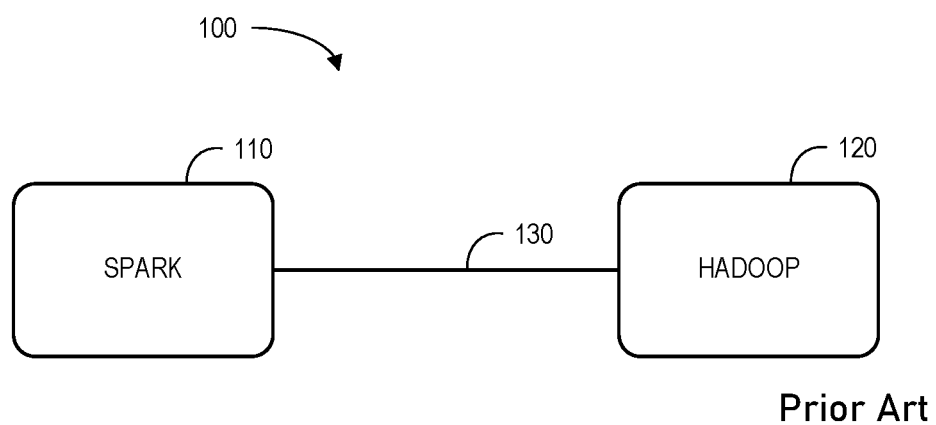
FIG. 1 is a typical system to perform big data analytics.
Figure 8:
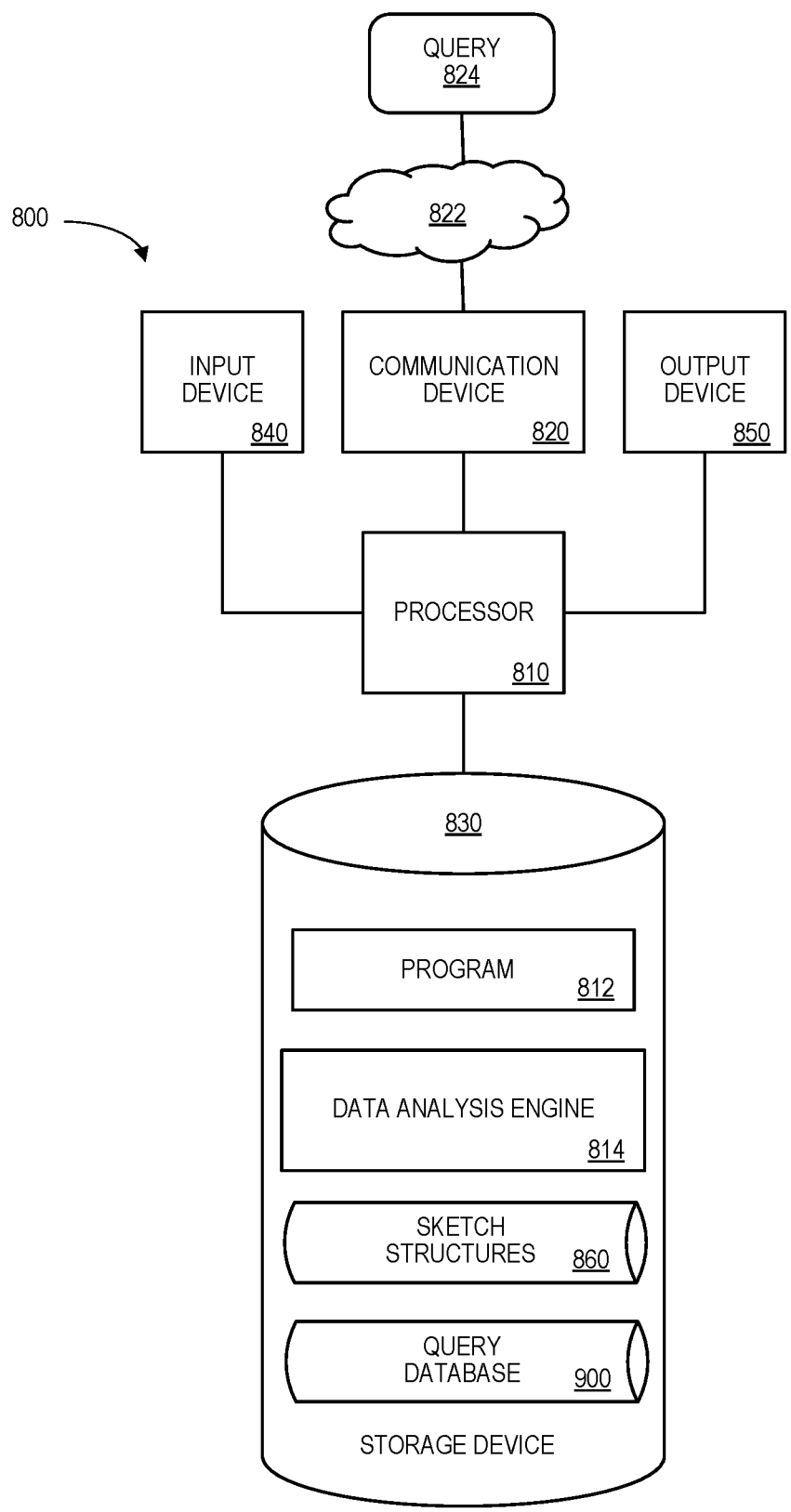
FIG. 8 is an apparatus or platform according to some embodiments.

Note that the embodiments described herein may be implemented using any number of different hardware configurations. For example, FIG. 8 is a block diagram of an apparatus or platform 800 that may be, for example, associated with the system 100 of FIG. 1 (and/or any other system described herein). The platform 800 comprises a processor 810, such as one or more commercially available CPUs in the form of one-chip microprocessors, coupled to a communication device 820 configured to communicate via a communication network (not shown in FIG. 8). The communication device 820 may be used to communicate, for example, with one or more remote user platforms or a query generating device 824 via a communication network 822. The platform 800 further includes an input device 840 (e.g., a computer mouse and/or keyboard to input data about monitored system or data sources) and an output device 850 (e.g., a computer monitor to render a display, transmit recommendations or alerts, and/or create monitoring reports). According to some embodiments, a mobile device and/or PC may be used to exchange data with the platform 800.

The processor 810 also communicates with a storage device 830. The storage device 830 can be implemented as a single database, or the different components of the storage device 830 can be distributed using multiple databases (that is, different deployment data storage options are possible). The storage device 830 may comprise any appropriate data storage device, including combinations of magnetic storage devices (e.g., a hard disk drive), optical storage devices, mobile telephones, and/or semiconductor memory devices.

The storage device 830 stores a program 812 and/or data analysis engine 814 for controlling the processor 810. The processor 810 performs instructions of the programs 812, 814, and thereby operates in accordance with any of the embodiments described herein. For example, the processor 810 may receive a stream of big data associated with the cloud computing environment. The processor 810 may then create a probabilistic data structure (e.g., a sketch) representing the received stream of big data and store the created probabilistic data structure into the probabilistic data structure repository. A request for data analytics is then received from a remote client browser. Responsive to the received request, the processor 810 may retrieve the probabilistic data structure from the probabilistic data structure repository and push a Wasm module and the retrieved probabilistic data structure to the client browser. According to some embodiments, the processor 810 may then receive new updates to the stream of big data and send delta changes to the client browser via a WebSocket protocol.

The programs 812, 814 may be stored in a compressed, uncompiled and/or encrypted format. The programs 812, 814 may furthermore include other program elements, such as an operating system, clipboard application, a database management system, and/or device drivers used by the processor 810 to interface with peripheral devices.

As used herein, data may be "received" by or "transmitted" to, for example: (i) the platform 800 from another device; or (ii) a software application or module within the platform 800 from another software application, module, or any other source.

In some embodiments (such as the one shown in FIG. 8), the storage device 830 further stores sketch structures 860 and a query database 900. An example of a database that may be used in connection with the platform 800 will now be described in detail with respect to FIG. 9. Note that the database described herein is only one example, and additional and/or different data may be stored therein. Moreover, various databases might be split or combined in accordance with any of the embodiments described herein.

Figure 9:
FIG. 9 illustrates a query database in accordance with some embodiments.

Referring to FIG. 9, a table is shown that represents the query database 900 that may be stored at the platform 800 according to some embodiments. The table may include, for example, entries identifying queries received in connection with a cloud computing environment. The table may also define fields 902, 904, 906, 908 for each of the entries. The fields 902, 904, 906, 908 may, according to some embodiments, specify a query identifier 902, a sketch 904, a query type 906, and a query result 908. The query database 900 may be created and updated, for example, when a new system is monitored, when results 908 are generated, etc.

The query identifier 902 might be a unique alphanumeric label or link that is associated with a received big data analytics query. The sketch 904 might indicate one or more appropriate sketch structures 860 that should be used to respond to that query. The query type 906 might, for example, indicate which value should be used via hash functions to extract information from the sketch structure 860. The query result 908 reflects the extracted information (e.g., after a min ( ) function is performed on the extracted values) that can be output in response to the query.

Figure 10:
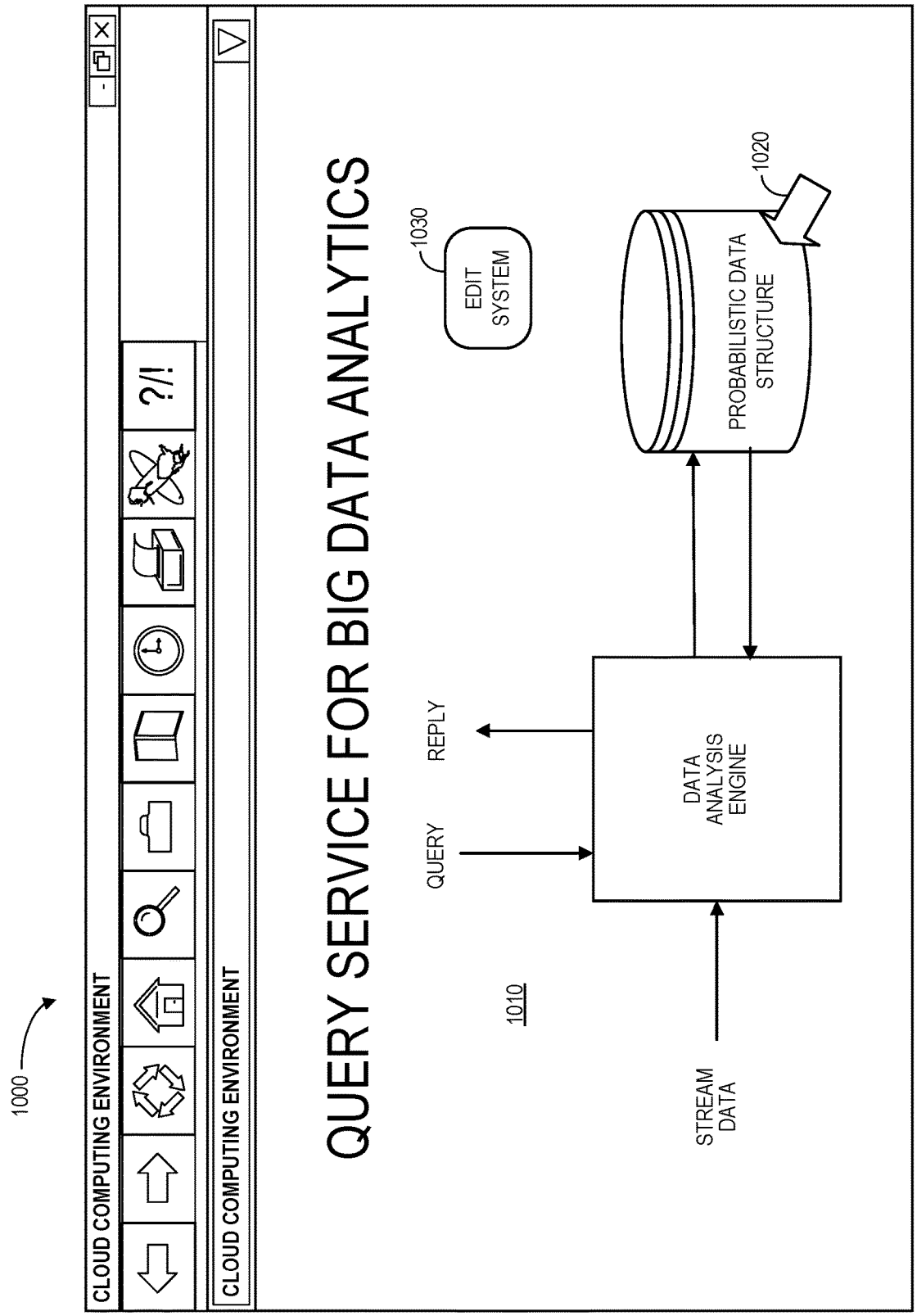
FIG. 10 is a human machine interface display in accordance with some embodiments.

FIG. 10 is a human-machine interface display 1000 in accordance with some embodiments. The display 1000 includes a graphical representation 1010 or dashboard that might be used to manage or monitor a query service for big data analytics framework (e.g., associated with a cloud provider). In particular, selection of an element (e.g., via a touchscreen or computer mouse pointer 1020) might result in the display of a popup window that contains configuration data. The display 1000 may also include a user-selectable "Edit System" icon 1030 to request system changes (e.g., to investigate or improve system performance).

Thus, embodiments may help perform big data analytics for a cloud computing environment in an efficient and approximate manner. Although some embodiments have been described in connection with the domain of API management, note that embodiments may be extended to other domains as well. For example, some embodiments may be generalized for various domains to make services that can be reused across domains to handle big data (when some degree of approximation is acceptable). Embodiments may:

allow for a move to simplified architectures,
reduce the cost of operations, and
provide substantial savings for data storage.

Embodiments may also reduce the computing and network load on the server, as complete analytic data is transmitted in a secured and compressed form to the browser. Some embodiments even let the data get quickly updated as more data arrives in an almost a real-time fashion. This will improve the customer experience because every operation on data only happens on the client and is refreshed almost instantaneously.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 11:
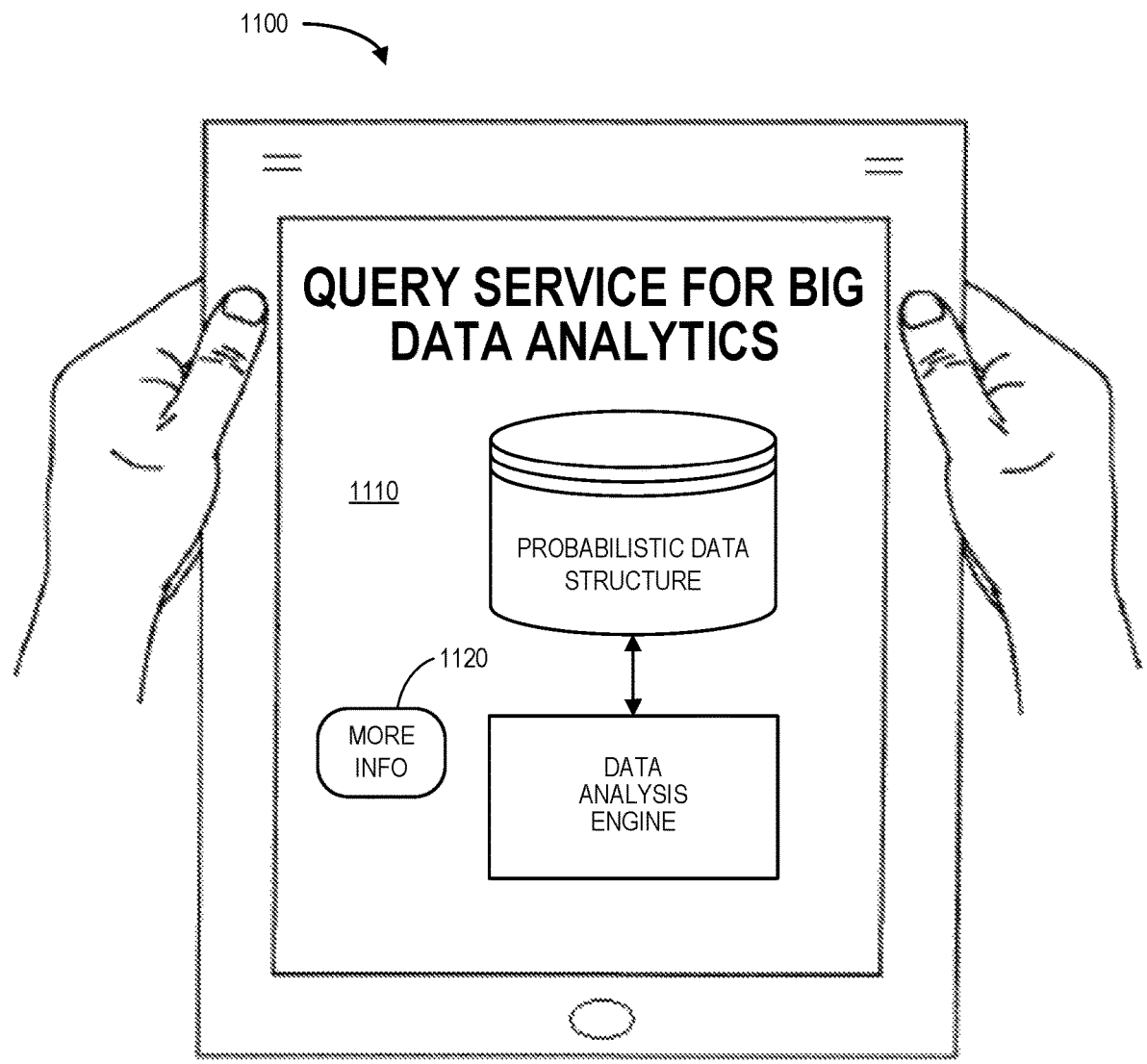
FIG. 11 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of big data queries, any of the embodiments described herein could be applied to other types of big data situations. Moreover, the displays shown herein are provided only as examples, and any other type of user interface could be implemented. For example, FIG. 11 shows a handheld tablet computer 1100 rendering a query service for big data analytics display 1110 that may be used to view or adjust existing system framework components and/or to request additional data (e.g., via a "More Info" icon 1120).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to facilitate data analysis for a cloud computing environment, comprising:
    a probabilistic data structure repository; and
    a data analysis server, coupled to the probabilistic data structure repository, including:
        a computer processor, and a memory storage device, coupled to the computer processor, including instructions that, when executed by the computer processor, enable the data analysis server to:
            (i) receive a stream of big data associated with the cloud computing environment,
            (ii) create a probabilistic data structure representing the received stream of big data, wherein the probabilistic data structure comprises a hash-based sketch,
            (iii) store the created probabilistic data structure into the probabilistic data structure repository,
            (iv) receive from a remote client browser a request for data analytics,
            (v) responsive to the received request, retrieve the probabilistic data structure from the probabilistic data structure repository, and
            (vi) push a WebAssembly ("Wasm") module and the retrieved probabilistic data structure to the remote client browser;
        wherein the data analysis server is further to receive new updates to the stream of big data and send delta changes to the remote client browser via a WebSocket protocol.

2. The method of claim 1, wherein multiple sketches are applied to the received stream of big data.

3. The system of claim 2, wherein at least one of the sketches are associated with: (i) a MinHash, (ii) a HyperLogLog, (iii) a BloomFilter, (iv) a Count-Min sketch, and (v) a t-Digest.

4. The system of claim 1, wherein the request for data analytics is associated with at least one of: (i) capturing trend information, (ii) detecting patterns, and (iii) aggregating the stream of big data.

5. The system of claim 4, wherein the request for data analytics is further associated with at least one of: (i) cardinality estimation, and (ii) temporal information.

6. The system of claim 5, wherein the Wasm module exposes: (i) a read data from sketch function, and (ii) an update sketch function.

7. The system of claim 1, wherein the client browser executes the Wasm module in a Wasm browser sandbox associated with a memory heap that is not accessible from outside the Wasm browser sandbox.

8. A computer-implemented method to facilitate data analysis for a cloud computing environment, comprising:
    receiving, by a computer processor of a data analysis server, a stream of big data associated with the cloud computing environment;
    creating a probabilistic data structure representing the received stream of big data, wherein the probabilistic data structure comprises a hash-based sketch;
    storing the created probabilistic data structure into a probabilistic data structure repository;
    receiving, from a remote client browser, a request for data analytics;
    responsive to the received request, retrieving the probabilistic data structure from the probabilistic data structure repository; and
    pushing a WebAssembly ("Wasm") module and the retrieved probabilistic data structure to the remote client browser;
    wherein the data analysis server is further to receive new updates to the stream of big data and send delta changes to the remote client browser via a WebSocket protocol.

9. The method of claim 8, wherein multiple sketches are applied to the received stream of big data.

10. The method of claim 9, wherein at least one of the sketches are associated with: (i) a MinHash, (ii) a HyperLogLog, (iii) a BloomFilter, (iv) a Count-Min sketch, and (v) a t-Digest.

11. The method of claim 8, wherein the request for data analytics is associated with at least one of: (i) capturing trend information, (ii) detecting patterns, and (iii) aggregating the stream of big data.

12. The method of claim 11, wherein the request for data analytics is further associated with at least one of: (i) cardinality estimation, and (ii) temporal information.

13. The method of claim 12, wherein the Wasm module exposes: (i) a read data from sketch function, and (ii) an update sketch function.

14. The method of claim 8, wherein the client browser executes the Wasm module in a Wasm browser sandbox associated with a memory heap that is not accessible from outside the Wasm browser sandbox.

15. A non-transitory, computer readable medium having executable instructions stored therein to perform a method to facilitate data analysis for a cloud computing environment, the method comprising:

receiving, by a computer processor of a data analysis server, a stream of big data associated with the cloud computing environment;

creating a probabilistic data structure representing the received stream of big data, wherein the probabilistic data structure comprises a hash-based sketch;

storing the created probabilistic data structure into a probabilistic data structure repository;

receiving, from a remote client browser, a request for data analytics;

responsive to the received request, retrieving the probabilistic data structure from the probabilistic data structure repository; and pushing a WebAssembly ("Wasm") module and the retrieved probabilistic data structure to the remote client browser;

wherein the data analysis server is further to receive new updates to the stream of big data and send delta changes to the remote client browser via a WebSocket protocol.

\* \* \* \* \*